US011915681B2

(12) United States Patent
Ito et al.

(10) Patent No.: US 11,915,681 B2
(45) Date of Patent: Feb. 27, 2024

(54) INFORMATION PROCESSING DEVICE AND CONTROL METHOD

(71) Applicant: Mitsubishi Electric Corporation, Tokyo (JP)

(72) Inventors: Akihiro Ito, Tokyo (JP); Satoru Furuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 141 days.

(21) Appl. No.: 17/579,286

(22) Filed: Jan. 19, 2022

(65) Prior Publication Data

US 2022/0139367 A1 May 5, 2022

Related U.S. Application Data

(63) Continuation of application No. PCT/JP2019/029983, filed on Jul. 31, 2019.

(51) Int. Cl.
*G10K 11/34* (2006.01)
*G10L 25/84* (2013.01)
(Continued)

(52) U.S. Cl.
CPC .............. *G10K 11/34* (2013.01); *G10L 25/84* (2013.01); *H04R 1/406* (2013.01); *H04R 3/00* (2013.01)

(58) Field of Classification Search
CPC .... G10K 11/34; G10K 2200/10; G10L 25/78; G10L 25/84; H04N 1/113; H04R 1/406;
(Continued)

(56) References Cited

U.S. PATENT DOCUMENTS 9,530,407 B2 * 12/2016 Katuri .................... H04R 3/005
2006/0075422 A1 * 4/2006 Choi .................... G01S 3/7864 725/18
(Continued)

FOREIGN PATENT DOCUMENTS

JP 2006-123161 A 5/2006
JP 2019-80246 A 5/2019

OTHER PUBLICATIONS

Asano, "Array Signal Processing of Sound—Localization/Tracking and Separation of Sound Source", 2011, Corona Publishing Co., Ltd., total 4 pages.
(Continued)

*Primary Examiner* — Lun-See Lao
(74) *Attorney, Agent, or Firm* — Birch, Stewart, Kolasch & Birch, LLP

(57) ABSTRACT

An information processing device includes a signal acquisition unit that acquires a voice signal of an object person outputted from a mic array and a control unit that acquires at least one of noise level information indicating a noise level of noise and first information as information indicating whether or not an obstructor is speaking while obstructing speech of the object person and changes a beam width as a width of a beam corresponding to an angular range of acquired sound, centering at the beam representing a direction in which voice of the object person is inputted to the mic array, and dead zone formation intensity as a degree of suppressing at least one of the noise and voice of the obstructor inputted to the mic array based on at least one of the noise level information and the first information.

4 Claims, 10 Drawing Sheets

(51) Int. Cl.
*H04R 1/40* (2006.01)
*H04R 3/00* (2006.01)

(58) Field of Classification Search
CPC .. H04R 2430/25; H04R 2499/13; H04R 3/00; H04R 3/005
USPC ...................... 381/56–58, 94.1–94.5; 700/94
See application file for complete search history.

(56) References Cited

U.S. PATENT DOCUMENTS

| | | | | |
|---|---|---|---|---|
| 2010/0158267 | A1* | 6/2010 | Thormundsson | H04R 3/005 381/92 |
| 2018/0249245 | A1* | 8/2018 | Secall | G10L 25/93 |
| 2023/0124859 | A1* | 4/2023 | Pandey | H04M 3/568 381/71.1 |

OTHER PUBLICATIONS

International Search Report for PCT/JP2019/029983 dated Sep. 10, 2019.

Written Opinion of the International Searching Authority for PCT/JP2019/029983 dated Sep. 10, 2019.

* cited by examiner

FIG. 7

191

| PARAMETER DETERMINATION TABLE | | | |
|---|---|---|---|
| SPEECH (NARROW) OF OBSTRUCTOR | SPEECH (WIDE) OF OBSTRUCTOR | NOISE HIGH/LOW | $\mu$ |
| PRESENT | PRESENT | HIGH | 1.0 |
| PRESENT | PRESENT | LOW | 1.0 |
| PRESENT | ABSENT | HIGH | 1.0 |
| PRESENT | ABSENT | LOW | 0.01 |
| ABSENT | PRESENT | HIGH | 1.0 |
| ABSENT | PRESENT | LOW | 1.0 |
| ABSENT | ABSENT | HIGH | 1.0 |
| ABSENT | ABSENT | LOW | 0.01 |

INFORMATION PROCESSING DEVICE AND CONTROL METHOD

CROSS-REFERENCE TO RELATED APPLICATION

This application is a continuation application of International Application No. PCT/JP2019/029983 having an international filing date of Jul. 31, 2019, the disclosure of which is incorporated herein by reference in its entirety.

BACKGROUND OF THE INVENTION

1. Field of the Invention

The present disclosure relates to an information processing device and a control method.

2. Description of the Related Art

There has been known beamforming. For example, a technology regarding the beamforming is described in Patent Reference 1. The beamforming includes fixed beamforming and adaptive beamforming. As a type of the adaptive beamforming, there has been known Minimum Variance (MV) (see Non-patent Reference 1).

Patent Reference 1: Japanese Patent Application Publication No. 2006-123161

Non-patent Reference 1: Futoshi Asano, "Array Signal Processing of Sound—Localization/Tracking and Separation of Sound Source", Corona Publishing Co., Ltd., 2011

Incidentally, in the conventional adaptive beamforming, a beam width as the width of a beam corresponding to an angular range of acquired sound, centering at the beam representing the direction in which the voice of an object person is inputted to a mic array, and dead zone formation intensity as the degree of suppressing masking sound obstructing the voice of the object person are not changed depending on the situation. For example, when the adaptive beamforming is performed in a state in which the beam width is narrow and the dead zone formation intensity is high, in a situation where the angle between the masking sound inputted to the mic array and the voice of the object person inputted to the mic array is wide, sound in a narrow angular range can be acquired and the masking sound arriving from an angle outside the beam is suppressed, and thus the effect of the adaptive beamforming increases. In contrast, when the angle between the masking sound inputted to the mic array and the voice of the object person inputted to the mic array is narrow, the dead zone is formed to be closer to the beam. Therefore, the beam width narrows compared to the case where the angle between the masking sound inputted to the mic array and the voice of the object person inputted to the mic array is wide. Due to excessive narrowing of the beam width, slight deviation between the speaking direction of the object person and the beam direction becomes impermissible, and thus the effect of the adaptive beamforming decreases. Incidentally, the masking sound is, for example, voice, noise, etc. not from the object person. As above, not changing the beam width and the dead zone formation intensity depending on the situation is a problem.

SUMMARY OF THE INVENTION

An object of the present disclosure is to dynamically change the beam width and the dead zone formation intensity depending on the situation.

An information processing device according to an aspect of the present disclosure is provided. The information processing device includes a signal acquisition unit that acquires a voice signal of an object person outputted from a plurality of microphones and a control unit that acquires at least one of noise level information indicating a noise level of noise and first information as information indicating whether or not an obstructor is speaking while obstructing speech of the object person and changes a beam width as a width of a beam corresponding to an angular range of acquired sound, centering at the beam representing a direction in which voice of the object person is inputted to the plurality of microphones, and dead zone formation intensity as a degree of suppressing at least one of the noise and voice of the obstructor inputted to the plurality of microphones based on at least one of the noise level information and the first information.

According to the present disclosure, the beam width and the dead zone formation intensity can be changed dynamically depending on the situation.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 7 is a diagram showing an example of a parameter determination table;

DETAILED DESCRIPTION OF THE INVENTION

An embodiment will be described below with reference to the drawings. The following embodiment is just an example and a variety of modifications are possible within the scope of the present disclosure.

Embodiment

Figures 1A, 1B:
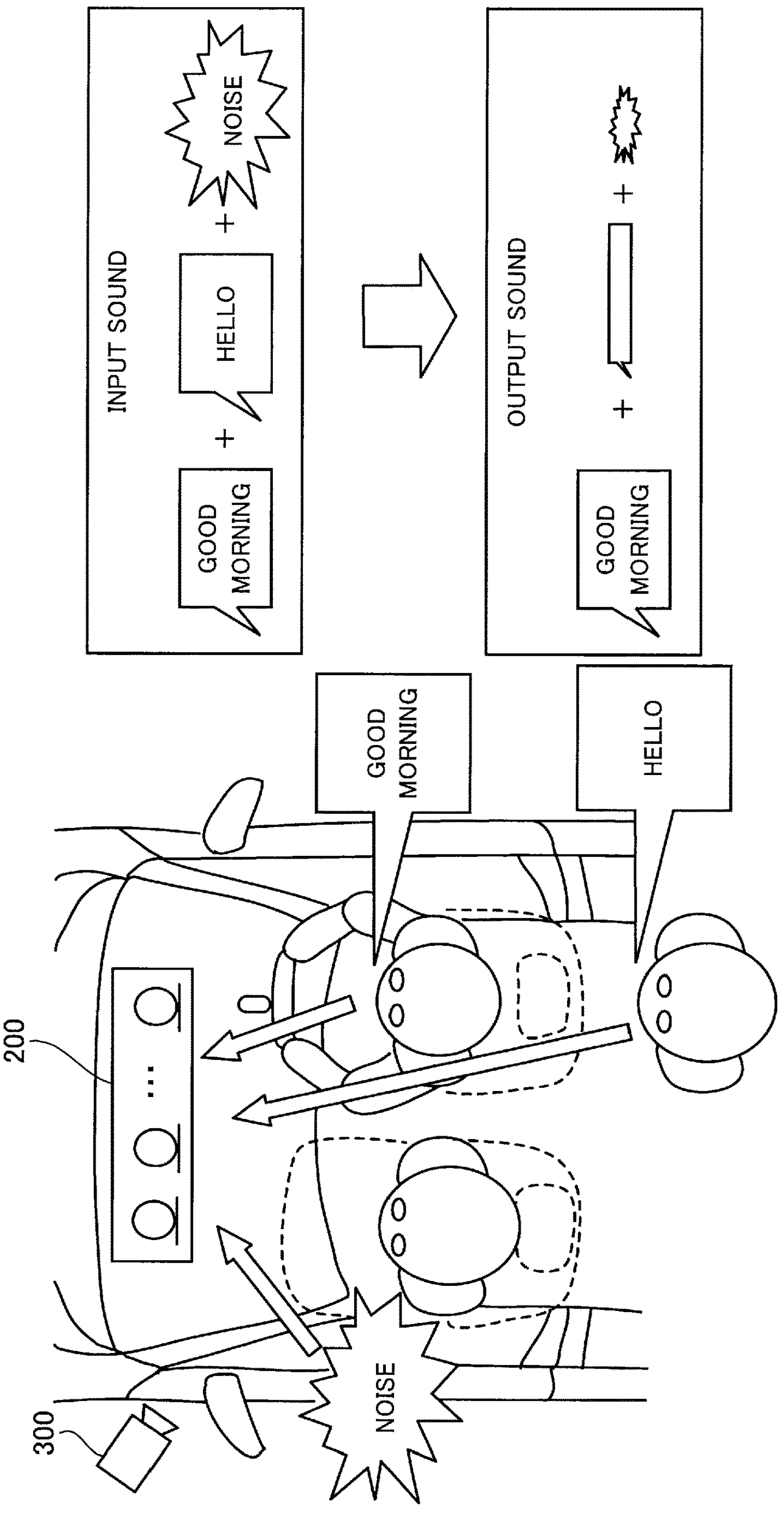
FIGS. 1(A) and 1(B) are diagrams showing a concrete example of an embodiment.

FIGS. 1(A) and 1(B) are diagrams showing a concrete example of the embodiment. FIG. 1(A) shows a state in which a plurality of users are riding a car.

Here, a user seated on the driver's seat is referred to as an object person. A user on the rear seat is referred to as an obstructor.

FIG. 1(A) shows a state in which the object person and the obstructor are speaking at the same time. Namely, the obstructor is speaking while obstructing the speech of the object person.

There are cases where images of faces of the object person and the obstructor are captured by a Driver Monitoring System (DMS) 300 including an image capturing device.

Voice of the object person and voice of the obstructor are inputted to a mic array 200. Further, noise is inputted to the mic array 200.

FIG. 1(B) indicates that the voice of the object person, the voice of the obstructor and the noise are inputted to the mic array 200 as input sound.

An information processing device which will be described later performs processing on a sound signal obtained by transducing the input sound into an electric signal. Specifically, the information processing device suppresses a voice signal of the obstructor and a noise signal. Namely, the information processing device suppresses the voice signal of the obstructor and the noise signal by forming a dead zone.

By this processing, suppressed voice of the obstructor is outputted as output sound. Further, suppressed noise is outputted as output sound.

The concrete example shown in FIG. 1 is an example of the embodiment. The embodiment is applicable to a variety of situations.

Next, a communication system in this embodiment will be described below.

Figure 2:
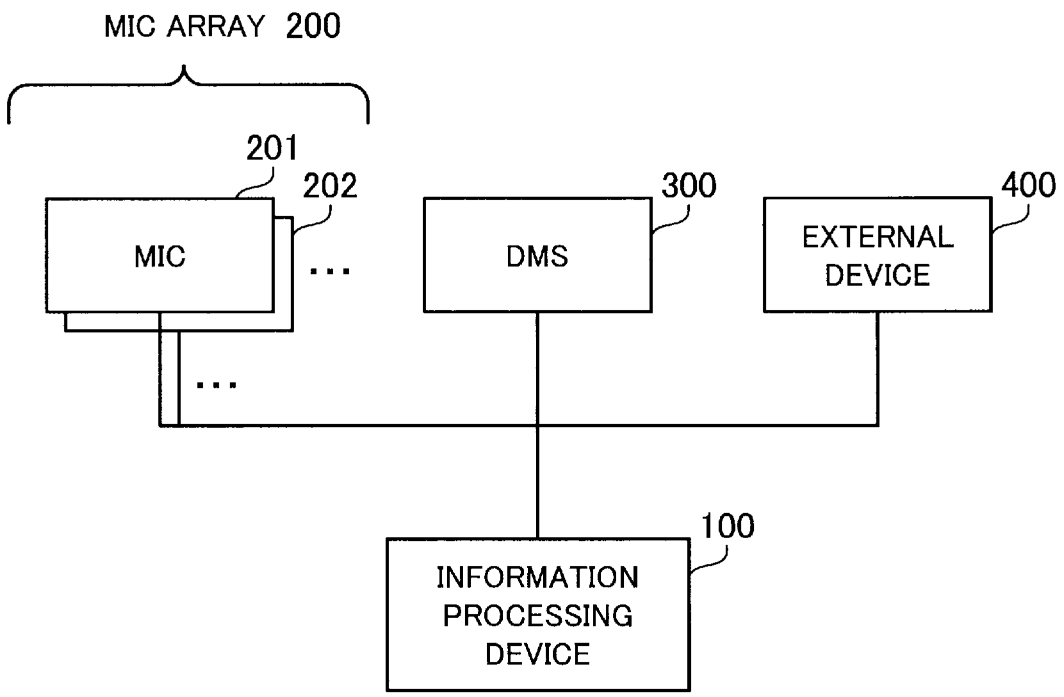
FIG. 2 is a diagram showing a communication system.

FIG. 2 is a diagram showing the communication system. The communication system includes an information processing device 100, the mic array 200, the DMS 300 and an external device 400.

The information processing device 100 is connected to the mic array 200, the DMS 300 and the external device 400.

The information processing device 100 is a device that executes a control method. For example, the information processing device 100 is a computer installed in a tablet device or a car navigation system.

The mic array 200 includes a plurality of mics. For example, the mic array 200 includes mics 201 and 202. Here, the mic means a microphone. The microphone will hereinafter be referred to as a mic. Each mic included in the mic array 200 includes a microphone circuit. For example, the microphone circuit captures vibration of the sound inputted to the mic. Then, the microphone circuit transduces the vibration into an electric signal.

The DMS 300 includes an image capturing device. The DMS 300 is referred to also as a speech level generation device. The DMS 300 generates a speech level of the obstructor. The speech level of the obstructor is a value indicating the degree to which the obstructor is speaking. For example, the DMS 300 may generate the speech level of the obstructor based on a face image of the obstructor obtained by the image capture. Further, for example, the DMS 300 may acquire information indicating that it is a state in which the angle between the direction in which the voice of the object person is inputted to the mic array 200 and the direction in which the voice of the obstructor is inputted to the mic array 200 is less than or equal to a threshold value from an image obtained by the image capture by the image capturing device. Then, the DMS 300 may generate the speech level of the obstructor based on a face image of the obstructor in that state. This speech level of the obstructor is referred to also as a speech level (narrow) of the obstructor. Furthermore, for example, the DMS 300 may acquire information indicating that it is a state in which the angle is greater than the threshold value from an image obtained by the image capture by the image capturing device. Then, the DMS 300 may generate the speech level of the obstructor based on a face image of the obstructor in that state. This speech level of the obstructor is referred to also as a speech level (wide) of the obstructor. The DMS 300 transmits the speech level of the obstructor to the information processing device 100.

The external device 400 is a speech recognition device, a hands-free communication device or an abnormal sound monitoring device, for example. The external device 400 can also be a speaker.

Next, hardware included in the information processing device 100 will be described below.

Figure 3:
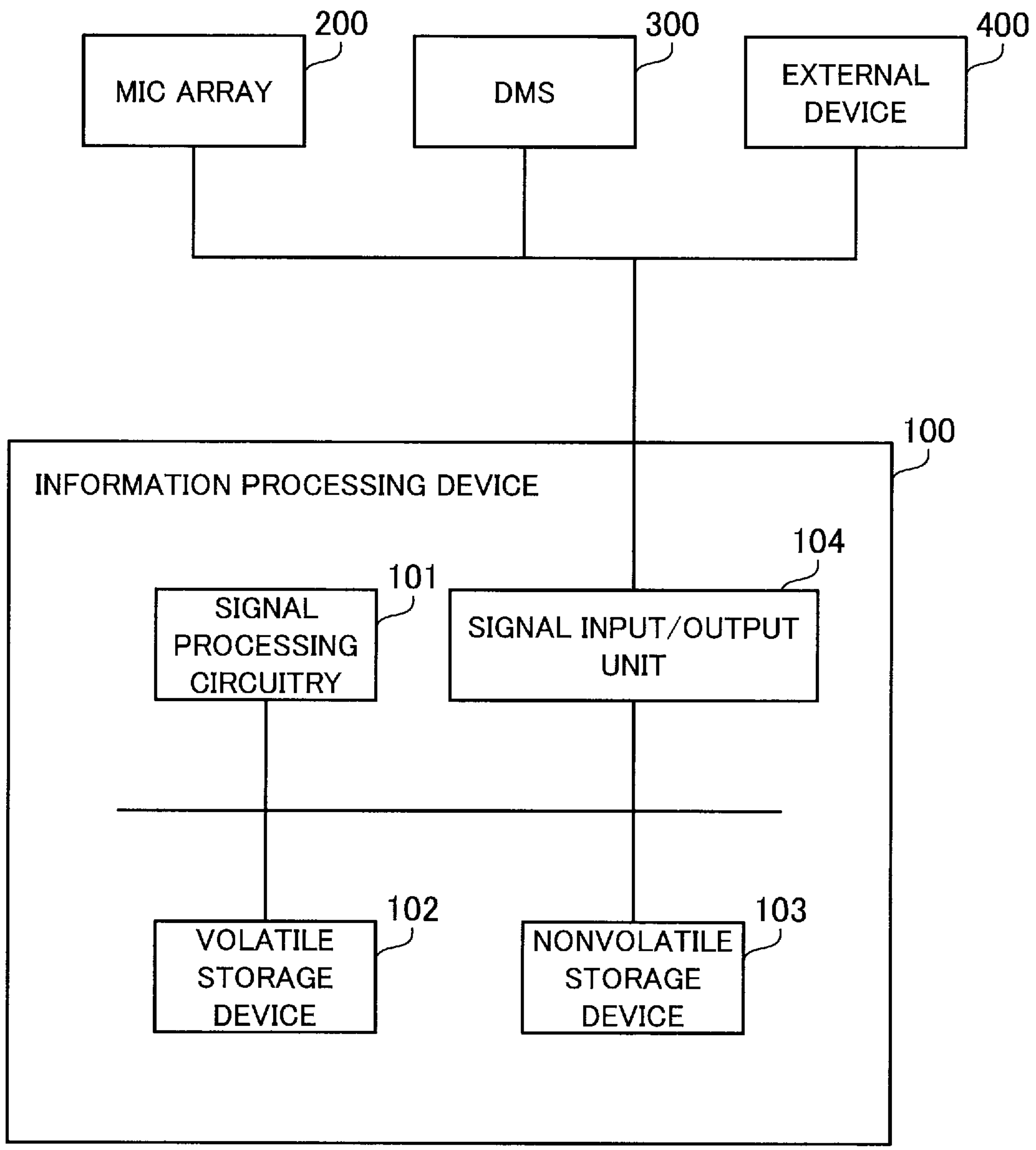
FIG. 3 is a diagram (No. 1) showing a hardware configuration included in an information processing device.

FIG. 3 is a diagram (No. 1) showing a hardware configuration included in the information processing device. The information processing device 100 includes a signal processing circuitry 101, a volatile storage device 102, a nonvolatile storage device 103 and a signal input/output unit 104. The signal processing circuitry 101, the volatile storage device 102, the nonvolatile storage device 103 and the signal input/output unit 104 are connected together by a bus.

The signal processing circuitry 101 controls the whole of the information processing device 100. For example, the signal processing circuitry 101 is a Digital Signal Processor (DSP), an Application Specific Integrated Circuit (ASIC), a Field-Programmable GATE Array (FPGA), a Large Scale Integrated circuit (LSI) or the like.

The volatile storage device 102 is main storage of the information processing device 100. For example, the volatile storage device 102 is a Synchronous Dynamic Random Access Memory (SDRAM).

The nonvolatile storage device 103 is auxiliary storage of the information processing device 100. For example, the nonvolatile storage device 103 is a Hard Disk Drive (HDD) or a Solid State Drive (SSD).

The volatile storage device 102 and the nonvolatile storage device 103 store setting data, signal data, information indicating an initial state before executing a process, constant data for control, and so forth.

The signal input/output unit 104 is an interface circuit. The signal input/output unit 104 is connected to the mic array 200, the DMS 300 and the external device 400.

The information processing device 100 may also have the following hardware configuration.

Figure 4:
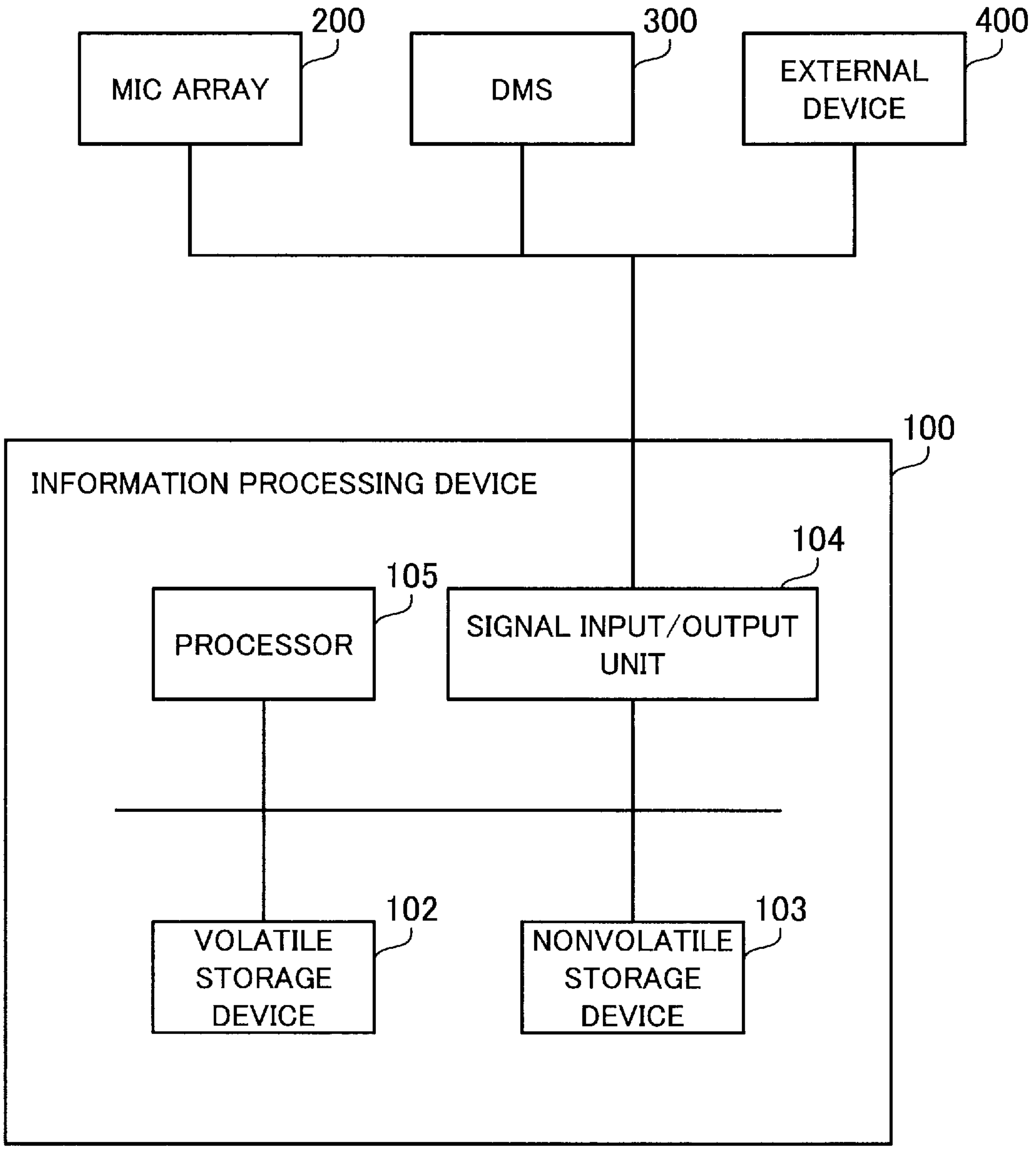
FIG. 4 is a diagram (No. 2) showing a hardware configuration included in the information processing device.

FIG. 4 is a diagram (No. 2) showing a hardware configuration included in the information processing device. The information processing device 100 includes a processor 105, the volatile storage device 102, the nonvolatile storage device 103 and the signal input/output unit 104.

The volatile storage device 102, the nonvolatile storage device 103 and the signal input/output unit 104 have already been described with reference to FIG. 3. Thus, the description is omitted for the volatile storage device 102, the nonvolatile storage device 103 and the signal input/output unit 104.

The processor 105 controls the whole of the information processing device 100. For example, the processor 105 is a Central Processing Unit (CPU).

Next, functions of the information processing device 100 will be described below.

Figure 5:
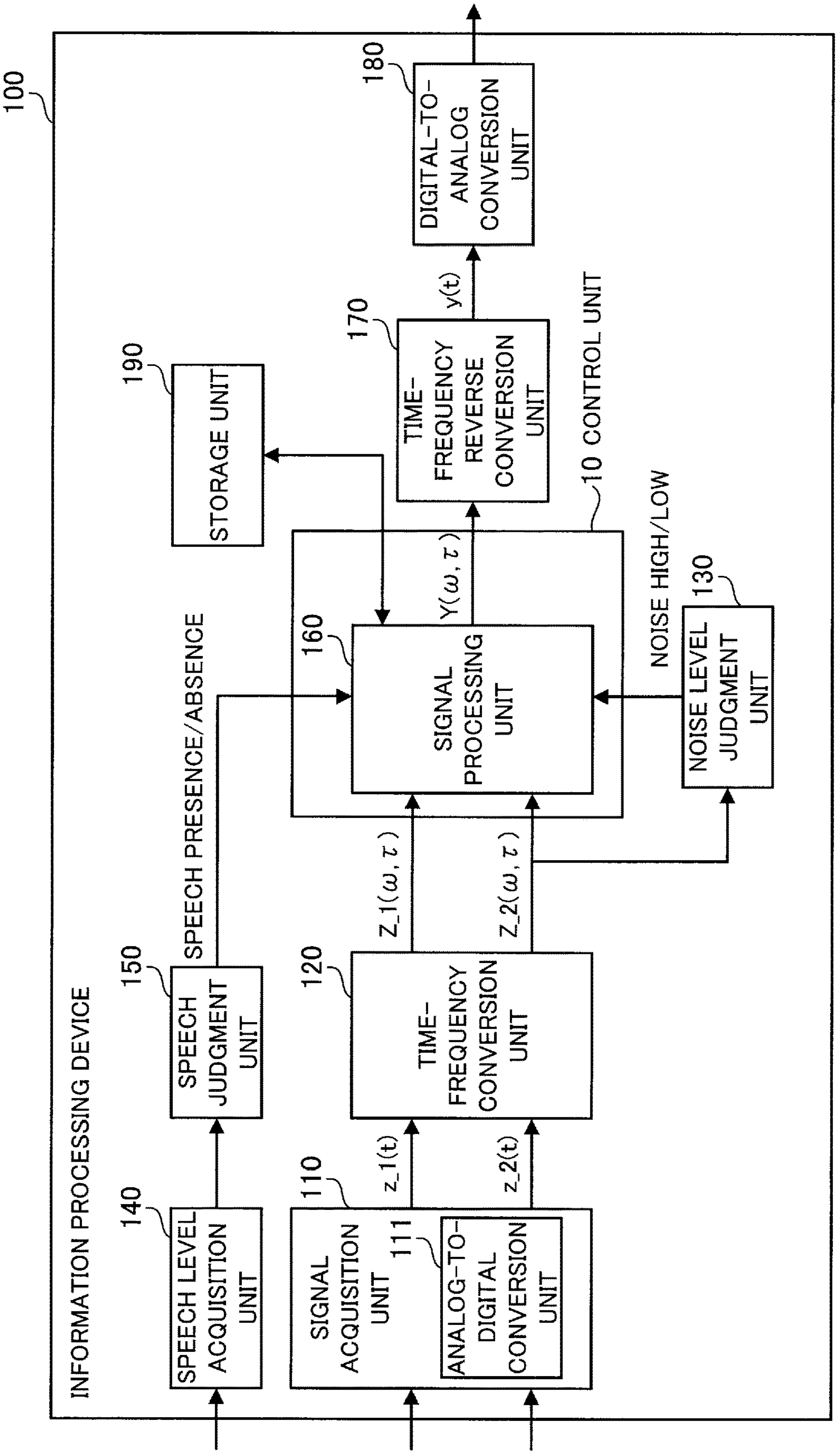
FIG. 5 is a functional block diagram showing the configuration of the information processing device.

FIG. 5 is a functional block diagram showing the configuration of the information processing device. The information processing device 100 includes a signal acquisition unit 110, a time-frequency conversion unit 120, a noise level judgment unit 130, a speech level acquisition unit 140, a speech judgment unit 150, a control unit 10, a digital-to-analog conversion unit 180 and a storage unit 190. The signal acquisition unit 110 includes an analog-to-digital conversion unit 111. The control unit 10 includes a signal processing unit 160 and a time-frequency reverse conversion unit 170.

Part or all of the signal acquisition unit 110, the analog-to-digital conversion unit 111 and the digital-to-analog conversion unit 180 may be implemented by the signal input/output unit 104.

Part or all of the control unit 10, the time-frequency conversion unit 120, the noise level judgment unit 130, the speech level acquisition unit 140, the speech judgment unit 150, the signal processing unit 160 and the time-frequency reverse conversion unit 170 may be implemented by the signal processing circuitry 101.

Part or all of the control unit 10, the signal acquisition unit 110, the time-frequency conversion unit 120, the noise level judgment unit 130, the speech level acquisition unit 140, the speech judgment unit 150, the signal processing unit 160 and the time-frequency reverse conversion unit 170 may be implemented as modules of a program executed by the processor 105. For example, the program executed by the processor 105 is referred to also as a control program.

The program executed by the processor 105 may be stored in the volatile storage device 102 or the nonvolatile storage device 103. The program executed by the processor 105 may also be stored in a storage medium such as a CD-ROM. Then, the storage medium may be distributed. The information processing device 100 may acquire the program from another device by using wireless communication or wire communication. The program may be combined with a program executed in the external device 400. The combined program may be executed by one computer. The combined program may be executed by a plurality of computers.

The storage unit 190 may be implemented as a storage area secured in the volatile storage device 102 or the nonvolatile storage device 103.

Incidentally, the information processing device 100 may also be configured not to include the analog-to-digital conversion unit 111 and the digital-to-analog conversion unit 180. In this case, the information processing device 100, the mic array 200 and the external device 400 transmit and receive digital signals by using wireless communication or wire communication.

Here, the functions of the information processing device 100 will be described. The signal acquisition unit 110 acquires the voice signal of the object person outputted from the mic array 200. This sentence may also be expressed as follows: The signal acquisition unit 110 is capable of acquiring the voice signal of the object person outputted from the mic array 200 and acquiring at least one of the noise signal of the noise and the voice signal of the obstructor obstructing the speech of the object person outputted from the mic array 200. The control unit 10 acquires noise level information indicating the noise level of the noise and information indicating whether or not the obstructor is speaking while obstructing the speech of the object person. Here, the information indicating whether or not the obstructor is speaking while obstructing the speech of the object person is referred to also as first information. The control unit 10 changes the beam width and the dead zone formation intensity based on at least one of the noise level information and the first information. For example, when the noise level information indicates a high value, the control unit 10 narrows the beam width and makes the dead zone formation intensity high. Further, for example, when the noise level information indicates a low value, the control unit 10 widens the beam width and makes the dead zone formation intensity low. Furthermore, for example, when the obstructor is obstructing the speech of the object person from a position close to the object person, the control unit 10 widens the beam width and makes the dead zone formation intensity low.

Incidentally, the beam width is the width of a beam corresponding to the angular range of the acquired sound, centering at the beam representing the direction in which the voice of the object person is inputted to the mic array 200. The dead zone formation intensity is the degree of suppressing at least one of the noise and the voice of the obstructor inputted to the mic array 200. Namely, the dead zone formation intensity is the degree of suppressing at least one of the noise and the voice of the obstructor by forming the dead zone in a direction in which at least one of the noise and the voice of the obstructor is inputted to the mic array 200. Incidentally, this direction is referred to also as a null. The dead zone formation intensity may also be represented as follows: The dead zone formation intensity is the degree of suppressing at least one of the noise signal of the noise inputted to the mic array 200 and the voice signal corresponding to the voice of the obstructor inputted to the mic array 200.

When at least one of the voice signal of the object person, the noise signal of the noise and the voice signal of the obstructor outputted from the mic array 200 is acquired by the signal acquisition unit 110, the control unit 10 suppresses at least one of the noise signal and the voice signal of the obstructor by using the beam width, the dead zone formation intensity and the adaptive beamforming.

Next, the functions of the information processing device 100 will be described in detail below.

Here, for the simplicity of the following explanation, the information processing device 100 is assumed to receive sound signals from two mics. The two mics are assumed to be the mic 201 and the mic 202. The positions of the mic 201 and the mic 202 have previously been determined. Further, the positions of the mic 201 and the mic 202 do not change. It is assumed that the direction in which the voice of the object person arrives does not change.

The following description will be given of a case where the beam width and the dead zone formation intensity are changed based on the noise level information and the first information. Further, the first information is represented as information indicating the presence/absence of speech of the obstructor.

The analog-to-digital conversion unit 111 receives input analog signals, each obtained by transducing input sound into an electric signal, from the mic 201 and the mic 202. The analog-to-digital conversion unit 111 converts the input analog signals into digital signals. Incidentally, when the input analog signal is converted into a digital signal, the input analog signal is divided into frame units. The frame unit is 16 ms, for example.

Further, a sampling frequency is used when the input analog signal is converted into a digital signal. The sampling frequency is 16 kHz, for example. The digital signal obtained by the conversion is referred to as an observation signal.

As above, the analog-to-digital conversion unit 111 converts the input analog signal outputted from the mic 201 into an observation signal $z\_1(t)$. Further, the analog-to-digital conversion unit 111 converts the input analog signal outputted from the mic 202 into an observation signal $z\_2(t)$. Incidentally, t represents the time.

The time-frequency conversion unit 120 calculates a time spectral component by executing fast Fourier transform based on the observation signal. For example, the time-frequency conversion unit 120 calculates a time spectral component $Z\_1(\omega, \tau)$ by executing fast Fourier transform of 512 points based on the observation signal $z\_1(t)$. The time-frequency conversion unit 120 calculates a time spectral component $Z\_2(\omega, \tau)$ by executing fast Fourier transform of 512 points based on the observation signal $z\_2(t)$. Incidentally, $\omega$ represents a spectrum number as a discrete frequency. The character $\tau$ represents a frame number.

The noise level judgment unit 130 calculates a power level of the time spectral component $Z\_2(\omega, \tau)$ by using an expression (1).

$$\text{the power level} = \sum_{\omega} |z\_2(\omega, \tau)|^2 \tag{1}$$

As above, the noise level judgment unit 130 calculates the power level in regard to a frame as a processing target by using the expression (1). Further, the noise level judgment unit 130 calculates power levels corresponding to a predetermined number of frames by using the expression (1). For example, the predetermined number is 100. The power levels corresponding to the predetermined number of frames may be stored in the storage unit 190. The noise level judgment unit 130 determines the minimum power level among the calculated power levels as a present noise level. Incidentally, the minimum power level may be regarded as the power level of the noise signal of the noise. When the present noise level exceeds a predetermined threshold value, the noise level judgment unit 130 judges that the noise is high. When the present noise level is less than or equal to the threshold value, the noise level judgment unit 130 judges that the noise is low. The noise level judgment unit 130 transmits information indicating that the noise is high or the noise is low to the signal processing unit 160. Incidentally, the information indicating that the noise is high or the noise is low is the noise level information.

The information indicating that the noise is high or the noise is low may be regarded as information expressed by two noise levels. For example, the information indicating that the noise is low may be regarded as noise level information indicating that the noise level is 1. The information indicating that the noise is high may be regarded as noise level information indicating that the noise level is 2.

Further, the noise level judgment unit 130 may judge the noise level by using a plurality of predetermined threshold values. For example, the noise level judgment unit 130 judges that the present noise level is "4" by using five threshold values. The noise level judgment unit 130 may transmit the noise level information indicating the result of the judgment to the signal processing unit 160.

As above, the noise level judgment unit 130 judges the noise level based on the noise signal. The noise level judgment unit 130 transmits the noise level information indicating the result of the judgment to the signal processing unit 160.

The speech level acquisition unit 140 acquires the speech level of the obstructor from the DMS 300. The speech level is represented by a value from 0 to 100.

Alternatively, the speech level acquisition unit 140 may acquire at least one of the speech level (narrow) of the obstructor and the speech level (wide) of the obstructor from the DMS 300. The speech level (narrow) of the obstructor is a value indicating the degree of the speech of the obstructor in the state in which the angle between the direction in which the voice of the object person is inputted to the mic array 200 and the direction in which the voice of the obstructor is inputted to the mic array 200 is less than or equal to the threshold value. The speech level (wide) of the obstructor is a value indicating the degree of the speech of the obstructor in the state in which the angle between the direction in which the voice of the object person is inputted to the mic array 200 and the direction in which the voice of the obstructor is inputted to the mic array 200 is greater than the threshold value.

Incidentally, the speech level (narrow) of the obstructor is referred to also as a first speech level. The speech level (wide) of the obstructor is referred to also as a second speech level. Further, the threshold value is referred to also as a first threshold value.

The speech judgment unit 150 judges whether the obstructor is speaking while obstructing the speech of the object person or not by using the speech level of the obstructor and a predetermined threshold value. For example, the predetermined threshold value is 50. Here, the predetermined threshold value is referred to also as a speech level judgment threshold value. A concrete process will be described here. When the speech level of the obstructor exceeds the speech level judgment threshold value, the speech judgment unit 150 judges that the obstructor is speaking while obstructing the speech of the object person. Namely, the speech judgment unit 150 judges that speech of the obstructor is present. When the speech level of the obstructor is less than or equal to the speech level judgment threshold value, the speech judgment unit 150 judges that the obstructor is not speaking while obstructing the speech of the object person. Namely, the speech judgment unit 150 judges that speech of the obstructor is absent. The speech judgment unit 150 transmits information indicating the presence/absence of speech of the obstructor to the signal processing unit 160. The information indicating the presence/absence of speech of the obstructor is referred to also as information indicating the result of the judgment by the speech judgment unit 150.

Similarly, the speech judgment unit 150 judges whether the obstructor is speaking while obstructing the speech of the object person or not based on the speech level judgment threshold value and at least one of the speech level (narrow) of the obstructor and the speech level (wide) of the obstructor. The speech judgment unit 150 transmits the information indicating the presence/absence of speech of the obstructor to the signal processing unit 160.

Further, the speech judgment unit 150 judges whether a plurality of obstructors are speaking while obstructing the speech of the object person or not based on each of the speech level (narrow) of the obstructor and the speech level (wide) of the obstructor and the speech level judgment threshold value. Specifically, the speech judgment unit 150 judges whether an obstructor is speaking while obstructing the speech of the object person or not based on the speech level (narrow) of the obstructor and the speech level judgment threshold value. The speech judgment unit 150 judges whether an obstructor is speaking while obstructing the speech of the object person or not based on the speech level (wide) of the obstructor and the speech level judgment threshold value. For example, if speech of the obstructor is judged to be present based on the speech level (narrow) of the obstructor and speech of the obstructor is judged to be present based on the speech level (wide) of the obstructor, it can be considered that a plurality of obstructors are obstructing the speech of the object person.

Here, it is also possible to judge the presence/absence of speech of the obstructor based on the voice signal of the obstructor outputted from the mic array 200. The speech judgment unit 150 judges whether the voice signal outputted from the mic array 200 is the voice signal of the object person or the voice signal of the obstructor based on the position of the object person, the position of the obstructor, and an arrival direction of the input sound inputted to the mic array 200. Incidentally, the position of the object person has been stored in the information processing device 100. For example, in the case of FIG. 1, information indicating the position of the driver's seat where the object person is situated has been stored in the information processing device 100. The position of the obstructor is determined by regarding the position as a position other than the position of the object person. The speech judgment unit 150 judges whether the obstructor is speaking while obstructing the speech of the object person or not by using voice activity detection, as a technology for detecting speech sections, and the voice signal of the obstructor. Namely, the speech judgment unit 150 judges the presence/absence of speech of the obstructor by using the voice signal of the obstructor and the voice activity detection.

Further, the speech level acquisition unit 140 may acquire a mouth opening level of the obstructor from the DMS 300. Here, the mouth opening level is the degree of opening the mouse. The speech judgment unit 150 may judge the presence/absence of speech of the obstructor based on the mouth opening level of the obstructor. For example, when the mouth opening level of the obstructor exceeds a predetermined threshold value, the speech judgment unit 150 judges that the obstructor spoke. Namely, when the mouth of the obstructor is wide open, the speech judgment unit 150 judges that the obstructor spoke.

To the signal processing unit 160, the time spectral component Z_1(ω, τ), the time spectral component Z_2(ω, τ), the information indicating the presence/absence of speech of the obstructor, and the information indicating that the noise is high or the noise is low are inputted.

The signal processing unit 160 will be described in detail below by using FIG. 6.

Figure 6:
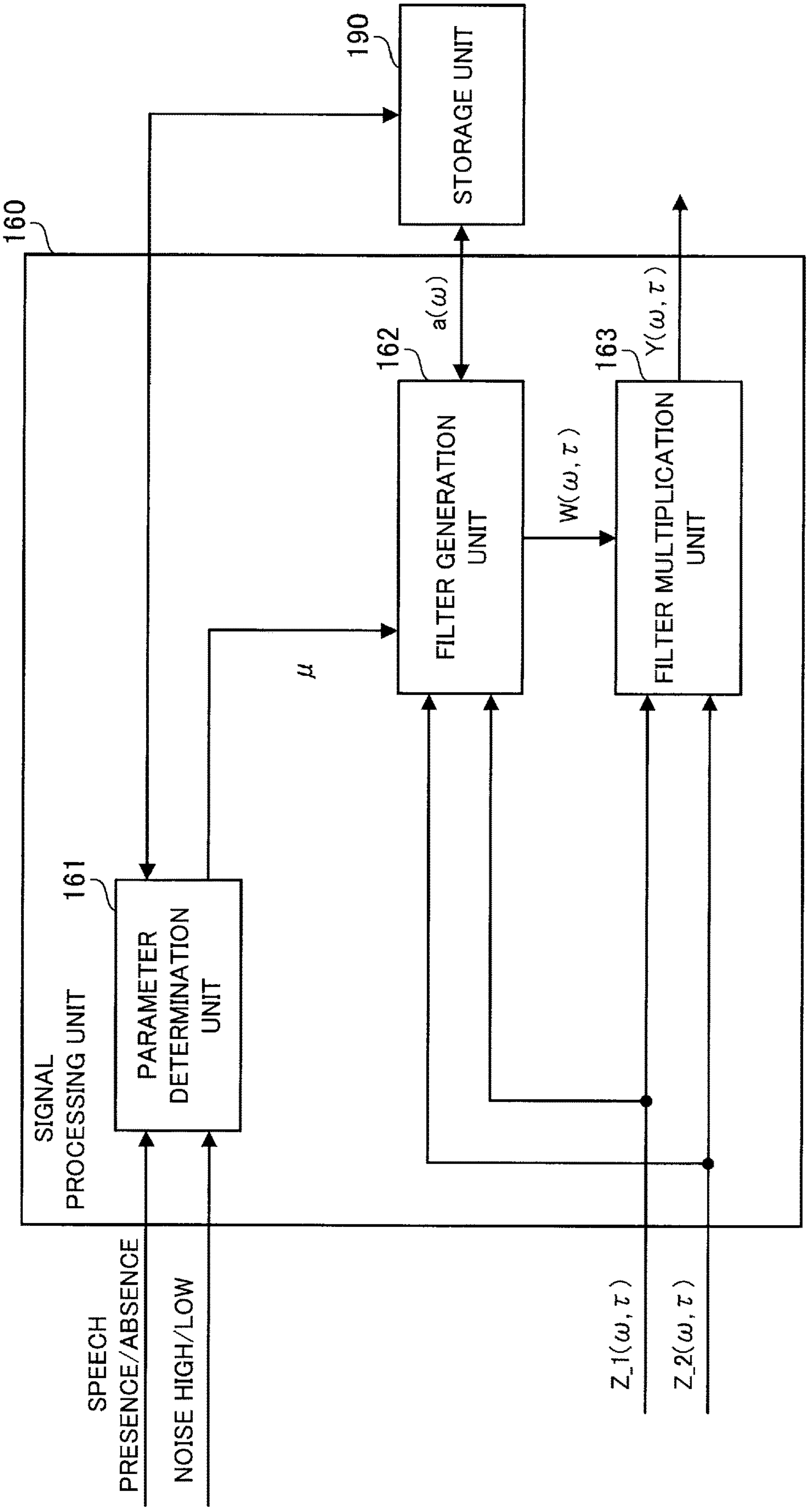
FIG. 6 is a diagram showing functional blocks included in a signal processing unit.

FIG. 6 is a diagram showing functional blocks included in the signal processing unit. The signal processing unit 160 includes a parameter determination unit 161, a filter generation unit 162 and a filter multiplication unit 163.

The parameter determination unit 161 determines a directivity parameter μ ($0 \le \mu \le 1$) based on the information indicating the presence/absence of speech of the obstructor and the information indicating that the noise is high or the noise is low. Incidentally, the directivity parameter μ closer to 0 indicates that the beam width is wider and the dead zone formation intensity is lower.

For example, when speech of the obstructor is present and the noise is high, the parameter determination unit 161 determines the directivity parameter μ at 1.0.

Further, the parameter determination unit 161 may determine the directivity parameter μ by using a parameter determination table. The parameter determination table will be described here.

FIG. 7 is a diagram showing an example of the parameter determination table. The parameter determination table 191 has been stored in the storage unit 190. The parameter determination table 191 includes items of SPEECH (NARROW) OF OBSTRUCTOR, SPEECH (WIDE) OF OBSTRUCTOR, NOISE HIGH/LOW, and μ.

When the speech judgment unit 150 has judged the speech of the obstructor based on the speech level (narrow) of the obstructor, the parameter determination unit 161 refers to the item of SPEECH (NARROW) OF OBSTRUCTOR. When the speech judgment unit 150 has judged the speech of the obstructor based on the speech level (wide) of the obstructor, the parameter determination unit 161 refers to the item of SPEECH (WIDE) OF OBSTRUCTOR. The item of NOISE HIGH/LOW indicates whether the noise is high or low. The item of μ indicates the directivity parameter μ.

As above, the parameter determination unit 161 may determine the directivity parameter μ by using the parameter determination table 191.

The filter generation unit 162 calculates a filter coefficient w(ω, τ). The filter generation unit 162 will be described in detail below by using FIG. 8.

Figure 8:
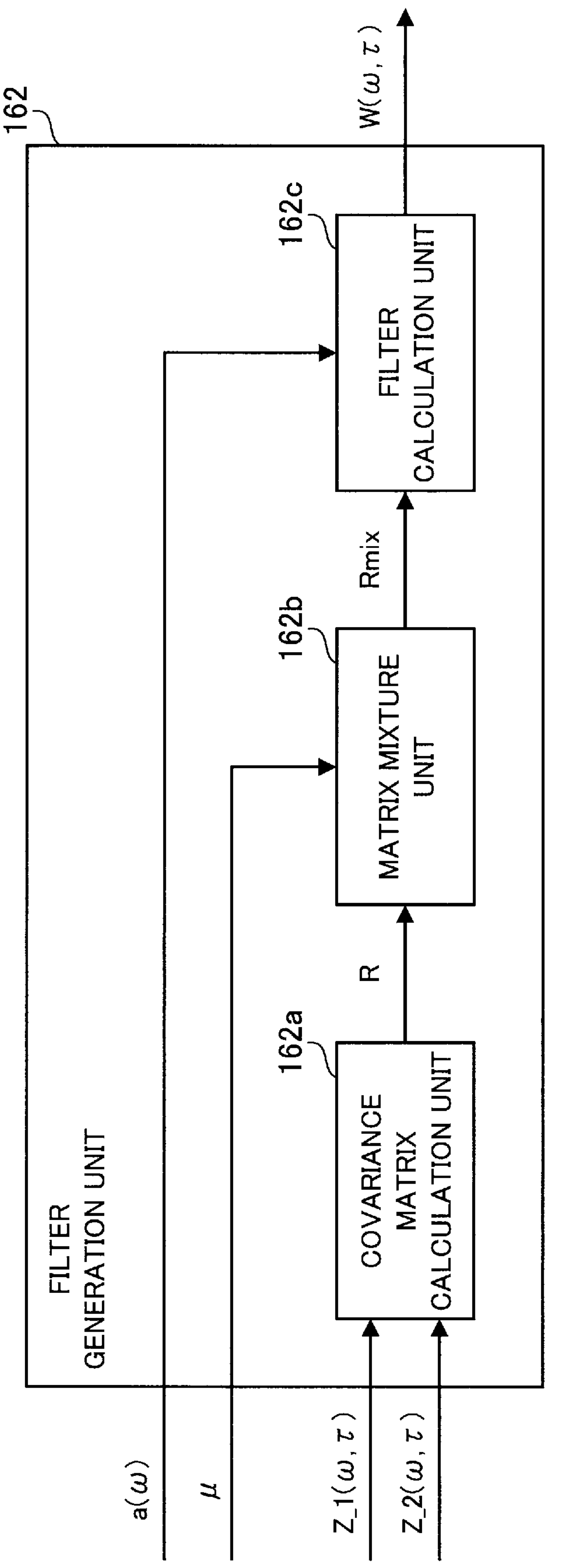
FIG. 8 is a diagram showing functional blocks included in a filter generation unit.

FIG. 8 is a diagram showing functional blocks included in the filter generation unit. The filter generation unit 162 includes a covariance matrix calculation unit **162*a*, a matrix mixture unit 162*b* and a filter calculation unit 162*c***.

The covariance matrix calculation unit **162*a* calculates a covariance matrix R based on the time spectral component Z_1(ω, τ) and the time spectral component Z_2(ω, τ). Specifically, the covariance matrix calculation unit 162*a*** calculates the covariance matrix R by using an expression (2). Incidentally, A is a forgetting coefficient. R_pre represents a covariance matrix R calculated the last time.

$$R=(1-\lambda)\times R\_\mathrm{pre}+\lambda\times R\_\mathrm{cur} \quad (2)$$

Further, R_cur is represented by using an expression (3). Incidentally, E represents an expected value. H represents Hermitian transposition.

$$R\_\mathrm{cur}=E[Z(\omega,\tau)Z(\omega,\tau)^H] \quad (3)$$

Furthermore, an observation signal vector Z(ω, τ) is represented by using an expression (4). Incidentally, T represents transposition.

$$Z(\omega,\tau)=[Z\_1(\omega,\tau),Z\_2(\omega,\tau)]^T \quad (4)$$

The matrix mixture unit **162*b*** calculates R_mix as a mixture of the covariance matrix R and a unit matrix I by using an expression (5). As mentioned here, I in the expression (5) is the unit matrix.

$$R\_\mathrm{mix}=(1-\mu)\times I+\mu\times R \quad (5)$$

The filter calculation unit **162*c* acquires a steering vector a(ω) from the storage unit 190. The filter calculation unit 162*c*** calculates the filter coefficient w(ω, τ) by using an expression (6). Incidentally, $R\_\mathrm{mix}^{-1}$ is the inverse matrix of R_mix. Further, the expression (6) is an expression based on the MV method.

$$w(\omega,\tau)=R\_\mathrm{mix}^{-1}a(\omega)/(a(\omega)^H R_{mix}^{-1}a(\omega)) \quad (6)$$

As above, the filter generation unit 162 dynamically changes the beam width and the dead zone formation intensity by calculating the filter coefficient w(ω, τ) based on the directivity parameter μ.

Next, returning to FIG. 6, the filter multiplication unit 163 will be described below.

The filter multiplication unit 163 calculates the Hermitian inner product of the filter coefficient w(ω, τ) and the observation signal vector Z(ω, τ). By this calculation, a spectral component Y(ω, τ) is calculated. Specifically, the filter multiplication unit 163 calculates the spectral component Y(ω, τ) by using an expression (7).

$$Y(\omega,\tau)=w(\omega,\tau)^H Z(\omega,\tau) \quad (7)$$

The signal processing unit 160 suppresses the noise signal and the voice signal of the obstructor as above.

Next, returning to FIG. 5, the time-frequency reverse conversion unit 170 will be described below.

The time-frequency reverse conversion unit 170 executes inverse Fourier transform based on the spectral component Y(ω, τ). By this inverse Fourier transform, the time-frequency reverse conversion unit 170 is capable of calculating an output signal y(t). The output signal y(t) includes the voice signal of the object person. Further, when at least one of the noise signal and the voice signal of the obstructor is outputted from the mic array 200, at least one of the noise signal and the voice signal of the obstructor is suppressed in the output signal y(t).

Incidentally, the output signal y(t) is a digital signal.

The digital-to-analog conversion unit 180 converts the output signal y(t) into an analog signal. The analog signal obtained by the conversion is referred to also as an output analog signal. The information processing device 100 outputs the output analog signal to the external device 400. It is also possible for the information processing device 100 to output the digital signal to the external device 400. In this case, the digital-to-analog conversion unit 180 does not convert the digital signal into the analog signal.

Next, a process executed by the information processing device 100 will be described below by using a flowchart.

Figure 9:
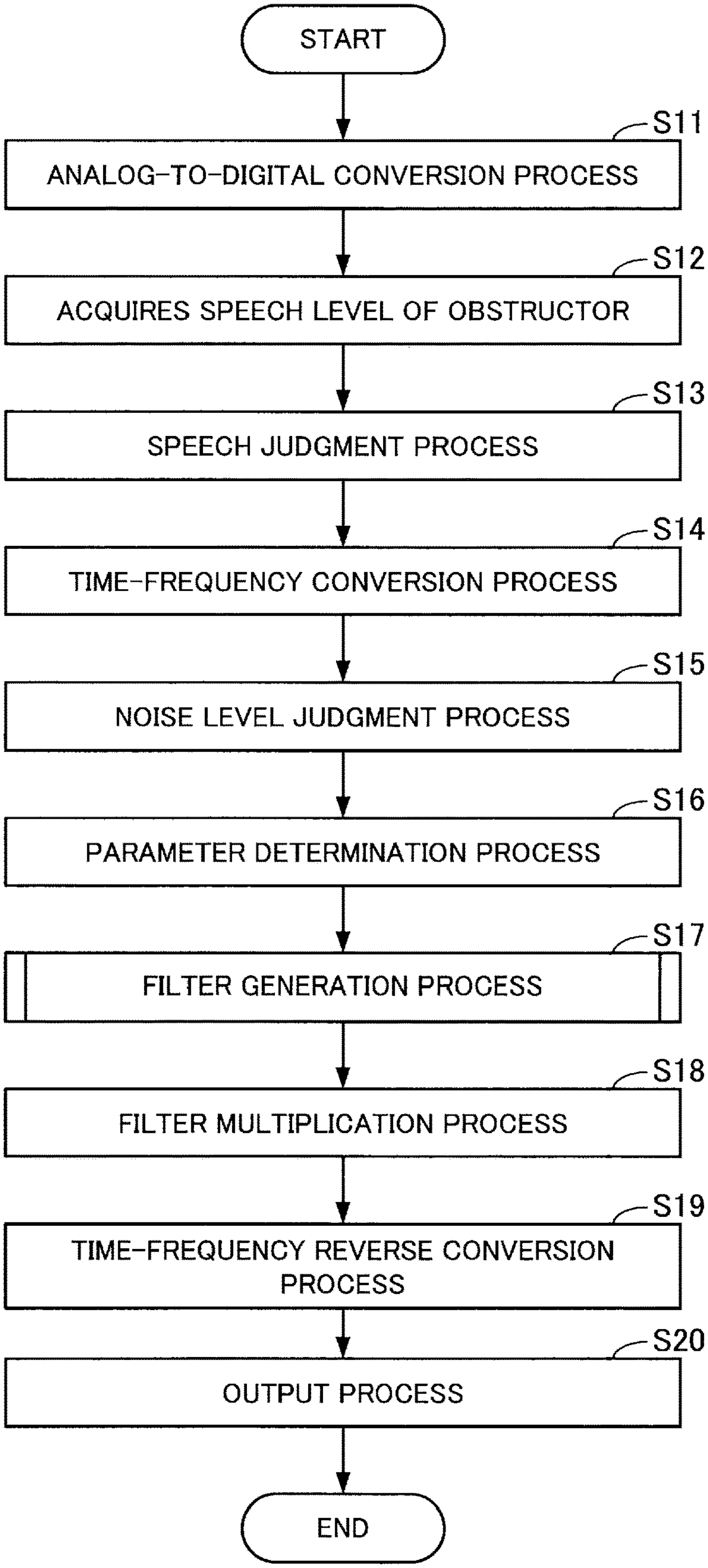
FIG. 9 is a flowchart showing an example of a process executed by the information processing device.

FIG. 9 is a flowchart showing an example of the process executed by the information processing device.

(Step S11) The analog-to-digital conversion unit 111 receives the input analog signals outputted from the mic 201 and the mic 202. The analog-to-digital conversion unit 111 executes an analog-to-digital conversion process. By this process, the input analog signals are converted into digital signals.

(Step S12) The speech level acquisition unit 140 acquires the speech level of the obstructor from the DMS 300.

(Step S13) The speech judgment unit 150 executes a speech judgment process. Then, the speech judgment unit 150 transmits the information indicating the presence/absence of speech of the obstructor to the signal processing unit 160.

(Step S14) The time-frequency conversion unit 120 executes a time-frequency conversion process. By this process, the time-frequency conversion unit 120 calculates the time spectral component Z_1(ω, τ) and the time spectral component Z_2(ω, τ).

(Step S15) The noise level judgment unit 130 executes a noise level judgment process. Then, the noise level judgment unit 130 transmits the information indicating that the noise is high or the noise is low to the signal processing unit 160.

Incidentally, the steps S12 and S13 may also be executed in parallel with the steps S14 and S15.

(Step S16) The parameter determination unit 161 executes a parameter determination process. Specifically, the parameter determination unit 161 determines the directivity parameter μ based on the information indicating the presence/absence of speech of the obstructor and the information indicating that the noise is high or the noise is low.

(Step S17) The filter generation unit 162 executes a filter generation process.

(Step S18) The filter multiplication unit 163 executes a filter multiplication process. Specifically, the filter multiplication unit 163 calculates the spectral component Y(ω, t) by using the expression (7).

(Step S19) The time-frequency reverse conversion unit 170 executes a time-frequency reverse conversion process. By this process, the time-frequency reverse conversion unit 170 calculates the output signal y(t).

(Step S20) The digital-to-analog conversion unit 180 executes an output process. Specifically, the digital-to-analog conversion unit 180 converts the output signal y(t) into an analog signal. The digital-to-analog conversion unit 180 outputs the output analog signal to the external device 400.

Figure 10:
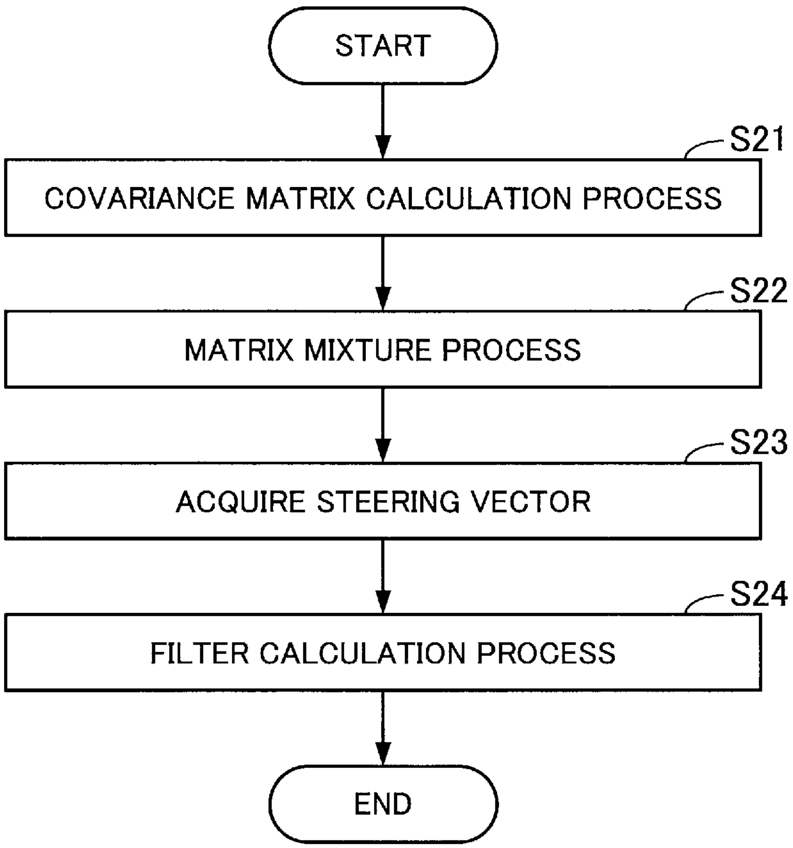
FIG. 10 is a flowchart showing a filter generation process.

FIG. 10 is a flowchart showing the filter generation process. FIG. 10 corresponds to the step S17.

(Step S21) The covariance matrix calculation unit 162*a* executes a covariance matrix calculation process. Specifically, the covariance matrix calculation unit 162*a* calculates the covariance matrix R by using the expression (2).

(Step S22) The matrix mixture unit 162*b* executes a matrix mixture process. Specifically, the matrix mixture unit 162*b* calculates R_mix by using the expression (5).

(Step S23) The filter calculation unit 162*c* acquires the steering vector a(G)) from the storage unit 190.

(Step S24) The filter calculation unit 162*c* executes a filter calculation process. Specifically, the filter calculation unit 162*c* calculates the filter coefficient w(G), t) by using the expression (6).

According to the embodiment, the information processing device 100 changes the beam width and the dead zone formation intensity based on at least one of the noise level information and the information indicating the presence/absence of speech of the obstructor. Namely, the information processing device 100 changes the beam width and the dead zone formation intensity depending on the situation. Thus, the information processing device 100 is capable of dynamically changing the beam width and the dead zone formation intensity depending on the situation.

Further, the information processing device 100 is capable of finely adjusting the beam width and the dead zone formation intensity based on the speech (narrow) of the obstructor or the speech (wide) of the obstructor.

DESCRIPTION OF REFERENCE CHARACTERS

10: control unit, 100: information processing device, 101: signal processing circuitry, 102: volatile storage device, 103: nonvolatile storage device, 104: signal input/output unit, 105: processor, 110: signal acquisition unit, 111: analog-to-digital conversion unit, 120: time-frequency conversion unit, 130: noise level judgment unit, 140: speech level acquisition unit, 150: speech judgment unit, 160: signal processing unit, 161: parameter determination unit, 162: filter generation unit, 162*a*: covariance matrix calculation unit, 162*b*: matrix mixture unit, 162*c*: filter calculation unit, 163: filter multiplication unit, 170: time-frequency reverse conversion unit, 180: digital-to-analog conversion unit, 190: storage unit, 191: parameter determination table, 200: mic array, 201, 202: mic, 300: DMS, 400: external device

What is claimed is:

1. An information processing device comprising:

a signal acquiring circuitry to acquire a voice signal of an object person outputted from a plurality of microphones;

a speech level acquiring circuitry to acquire at least one of a first speech level indicating a degree of speech of the obstructor in a state in which an angle between the direction in which the voice of the object person is inputted to the plurality of microphones and a direction in which the voice of the obstructor is inputted to the plurality of microphones is less than or equal to a first threshold value and a second speech level indicating the degree of the speech of the obstructor in a state in which the angle is greater than the first threshold value from a speech level generation device;

a speech judging circuitry to judge whether the obstructor is speaking while obstructing the speech of the object person or not based on a speech level judgment threshold value as a predetermined threshold value and at least one of the first speech level and the second speech level; and a controlling circuitry to acquire at least one of noise level information indicating a noise level of noise and first information as information indicating a result of the judgment, and change a beam width as a width of a beam corresponding to an angular range of acquired sound, centering at the beam representing a direction in which voice of the object person is inputted to the plurality of microphones, and dead zone formation intensity as a degree of suppressing at least one of the noise and voice of the obstructor inputted to the plurality of microphones based on at least one of the noise level information and the first information.

2. The information processing device according to claim 1, wherein the controlling circuitry changes the beam width and the dead zone formation intensity based on the noise level information and the first information.

3. The information processing device according to claim 1, further comprising a noise level judging circuitry, wherein the signal acquiring circuitry acquires a noise signal as a signal of the noise outputted from the plurality of microphones, and the noise level judging circuitry judges the noise level based on the noise signal.

4. An information processing device comprising:

a signal acquiring circuitry to acquire a voice signal of an object person outputted from a plurality of microphones;

a speech level acquiring circuitry to acquire a speech level indicating a degree of speech of the obstructor from a speech level generation device that generates the speech level;

a speech judging circuitry to judge whether the obstructor is speaking while obstructing the speech of the object person or not by using the speech level and a speech level judgment threshold value as a predetermined threshold value; and a controlling circuitry to acquire at least one of noise level information indicating a noise level of noise and first information as information indicating a result of the judgment and change a beam width as a width of a beam corresponding to an angular range of acquired sound, centering at the beam representing a direction in which voice of the object person is inputted to the plurality of microphones, and dead zone formation intensity as a degree of suppressing at least one of the noise and voice of the obstructor inputted to the plurality of microphones based on at least one of the noise level information and the first information.

* * * * *